(12) United States Patent
Tokunaga et al.

(10) Patent No.: US 6,768,236 B2
(45) Date of Patent: Jul. 27, 2004

(54) SPINDLE MOTOR AND DISK DRIVE FURNISHED THEREWITH

(75) Inventors: Shinya Tokunaga, Shiga (JP); Kaoru Uenosono, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 10/604,977

(22) Filed: Aug. 29, 2003

(65) Prior Publication Data

US 2004/0113501 A1 Jun. 17, 2004

(30) Foreign Application Priority Data

Sep. 13, 2002 (JP) ........................................ 2002-268976

(51) Int. Cl.[7] .............................. H02K 7/08; H02K 5/00
(52) U.S. Cl. ......................... 310/90; 384/112; 384/114; 384/107
(58) Field of Search ........................... 310/90, 254, 261, 310/272, 273; 384/286, 91, 93, 105, 107, 112, 114; 360/99.04, 99.08, 98.08

(56) References Cited

U.S. PATENT DOCUMENTS

| 5,715,116 | A | * | 2/1998 | Moritan et al. | .......... 360/99.08 |
|---|---|---|---|---|---|
| 6,211,592 | B1 | * | 4/2001 | Ichiyama | ...................... 310/90 |
| 6,250,808 | B1 | * | 6/2001 | Ichiyama | .................... 384/100 |
| 6,271,612 | B1 | * | 8/2001 | Tanaka et al. | ................. 310/90 |
| 6,307,291 | B1 | * | 10/2001 | Iwaki et al. | ................... 310/90 |
| 6,340,854 | B1 | * | 1/2002 | Jeong | ........................... 310/90 |
| 6,361,214 | B1 | * | 3/2002 | Ichiyama | .................... 384/107 |
| 6,483,215 | B1 | * | 11/2002 | Bodmer et al. | ............... 310/90 |
| 6,552,456 | B2 | * | 4/2003 | Goto et al. | .................... 310/90 |
| 6,554,476 | B2 | * | 4/2003 | Ishikawa et al. | ............ 384/123 |
| 6,574,186 | B2 | * | 6/2003 | Nii et al. | ..................... 369/269 |
| 6,664,687 | B2 | * | 12/2003 | Ichiyama | ................... 310/90.5 |
| 6,674,201 | B2 | * | 1/2004 | Liu et al. | ....................... 310/91 |
| 6,686,674 | B2 | * | 2/2004 | Ichiyama | ..................... 310/90 |

* cited by examiner

*Primary Examiner*—Burton S. Mullins
*Assistant Examiner*—Heba Y. Elkassabgi
(74) *Attorney, Agent, or Firm*—James Judge

(57) ABSTRACT

Spindle motor utilizing a dynamic-pressure bearing device having a full-fill structure and capable of discharging air bubbles from the lubricating oil after it is charged into the bearing device, as well as air bubbles appearing in the oil due to cavitation in handling. Thrust and radial bearing sections are configured within bearing clearances in between the rotor, the shaft, and a shaft-encompassing hollow bearing member. A communicating passage enabling the oil to redistribute itself within the bearing clearances is formed in the bearing member. At least one ray-like groove that reaches from the radially inward edge of dynamic-pressure-generating grooves in the thrust bearing section to the rim of the shaft-encompassing hollow is furnished in the bearing member. When the motor rotates the air bubbles are stirred and minced by the ray-like groove, and migrate toward release at the single oil-air interface.

18 Claims, 6 Drawing Sheets

SPINDLE MOTOR AND DISK DRIVE FURNISHED THEREWITH

BACKGROUND OF INVENTION

1. Technical Field

The present invention relates to spindle motors employing dynamic-pressure bearings in which oil is the working fluid, and to disk drives equipped with such spindle motors. The invention relates in particular to miniature, low-profile spindle motors that drive recording disks 2.5 inches and under, and to disk-drives equipped with such spindle motors.

2. Description of the Related Art

Dynamic-pressure bearings in which the fluid pressure of a lubricating fluid such as oil interposed in between the shaft and the sleeve is exploited in order to support the two letting the one rotate against the other have been proposed to date as bearings for spindle motors employed in disk drives that drive hard disks and like recording disks.

FIG. 1 depicts one example of a spindle motor employing dynamic-pressure bearings. This spindle motor in which conventional dynamic pressure bearings are employed is configured with a pair of axially separated radial bearing sections d, d in between the circumferential surface of the motor shaft b, which is integral with the rotor a, and the inner peripheral surface of the motor sleeve c, into which the shaft b is rotatively inserted. Likewise, a pair of thrust bearing sections g, g is configured in between the upper surface of a disk-shaped thrust plate e that projects radially outward from the circumferential surface of the shaft b on one of its ends, and the flat surface of a step formed in the sleeve c, as well as in between the lower surface of the thrust plate e and a thrust bush f that closes off one of the openings in the sleeve c.

A series of micro-gaps is formed in between the shaft b and thrust plate e, and the sleeve c and thrust bush f, and oil as a lubricating fluid is retained continuously without interruption within these micro-gaps. The oil retained in the micro-gaps is exposed to the air only within a taper-seal area h provided at the upper-end opening (the other opening in the sleeve c) of the gap formed in between the circumferential surface of the shaft b and the inner peripheral surface of the sleeve c. (This sort of oil-retaining structure will be denoted a "full-fill structure" hereinafter.)

The dynamic-pressure bearings further include herringbone grooves d1, d1 and g1, g1 that are linked pairs of spiral striations formed in the radial bearing sections d, d and thrust bearing sections g, g. In response to the rotor a rotating the grooves d1, d1 and g1, g1 generate maximum dynamic pressure in the bearing-section central areas where the spiral striation links are located, thereby supporting loads that act on the rotor a.

A way of charging oil into bearing devices with this sort of full-fill structure, in which difference in air pressure is exploited to replace the air in the micro-gaps with oil by dripping oil in the proper amount into an opening in the bearing in a reduced-pressure environment and thereafter restoring the pressure to normal, is the generally utilized method.

In an oil-charging method of this sort in which difference in air pressure is exploited, air bubbles are kept from remaining behind within the bearing micro-gaps by controlling how much the pressure is reduced and how long the bearing device and the oil are left under the reduced pressure environment. Nevertheless, due to the influence of processing work and assembly tolerances on the bearing-constituting materials, completely discharging air bubbles from the interior of the micro-gaps is problematic, and in some cases air bubbles end up staying mixed into the oil even though assembly of the bearing device has been completed.

Likewise, by vibration being applied to the rotor a during shipping and handling it can happen that air bubbles appear within the oil due to cavitation. Air bubbles produced by such cavitation tend to be especially likely to appear in the environs of the thrust bearing sections g, g.

If the motor is run with air bubbles mixed as they are into the oil, a problem arises that has an impact on the durability and reliability of the spindle motor, in that by and by the air bubbles swell in volume due to elevation in temperature, causing the oil to leak out to the bearing exterior. Another problem that arises has an impact on the rotational precision of the spindle motor, in that owing to the dynamic-pressure-generating grooves provided in the bearing sections coming into contact with the air bubbles, vibration occurs and NRRO (non-repeatable runout) worsens.

At times, moreover, individual air bubbles while rotating together with the rotor a cohere and form circumferentially oriented air pockets. If such an air pocket appears in the thrust bearing sections g, g, the herringbone grooves g1, g1 provided in the thrust bearing sections g, g become exposed to the air, which keeps the predetermined dynamic pressure from being generable and becomes a causative factor giving rise to abnormality in the amount of lift on the rotor a.

SUMMARY OF INVENTION

An object of the present invention is to render a spindle motor capable of discharging air bubbles from the bearing sections, and at the same time in which miniaturization and slimming in profile are feasible.

Another object of the invention is to render a spindle motor capable of sustaining at or above atmospheric pressure the internal pressure of the oil retained within the bearing clearances, and preventing air bubbles from being generated within the oil.

Still another object is to render a spindle motor that enables the internal pressure of the oil retained within the bearing clearances to balance.

The present invention is also the rendering of a low-profile, low-cost disk drive providing for stabilized spinning of recording disks.

Yet another object of the invention is to render a disk drive of superior reliability and endurance, capable of preventing incidents of read/write errors.

In one example of a spindle motor according to the invention, the rotor has a circular flat face extending radially outward from the circumferential surface of the shaft, and a series of bearing clearances filled with oil is formed in between the flat face of the rotor, and the shaft and a hollow cylindrical bearing member having a bearing hole into which the shaft is rotatively inserted. A thrust bearing section furnished with dynamic pressure grooves is formed in between the end face at an opening in the bearing member, and the flat face of the rotor; and a radial bearing section furnished with dynamic pressure grooves is formed in between the inner peripheral surface of the bearing hole and the circumferential surface of the shaft. In addition, at least one ray-like groove that reaches from the radially inward edge of the dynamic-pressure-generating grooves in the thrust bearing section to the bearing hole is furnished in the bearing member.

This configuration makes it possible to discharge air bubbles that either remain behind or are generated within the oil in a spindle motor utilizing dynamic-pressure bearings having a full-fill structure.

The situation within the oil retained in the gap formed in between the sleeve located radially inward of the thrust bearing section and the flat face of the rotor is that air bubbles stemming from cavitation on account of irregularities in the process of pouring in the oil and vibrations applied during shipping of the motor are liable to appear. Nevertheless, by at least unilaterally forming in the bearing member a ray-like groove that reaches from the radially inward edge of the dynamic-pressure-generating grooves provided in the thrust bearing section, to the bearing hole, when the motor rotates the air bubbles are stirred and minced by the ray-like groove, making it so that they are readily discharged.

In particular, the ray-like groove causes a circumferentially oriented pressure gradient to appear intermittently in the dynamic pressure generated in the thrust bearing section; and the rotation of this pressure gradient develops a random pressure distribution in the region radially inward beyond the thrust bearing section, while maintaining positive pressure. By the air bubbles being swept into a rotating random pressure distribution like this, the air bubbles are broken up until they are sufficiently smaller than the clearance dimension of the gap formed in between the flat face of the rotor and the end face of the bearing member, and are discharged toward the radially outer side of the thrust bearing section, where the oil internal pressure relatively low.

In one example of a disk drive according to the present invention is a recording-disk-spinning spindle motor in which the rotor has a circular flat face extending radially outward from the circumferential surface of the shaft, and a series of bearing clearances filled with oil is formed in between the flat face of the rotor, and the shaft and a hollow cylindrical bearing member having a bearing hole into which the shaft is rotatively inserted. A thrust bearing section furnished with dynamic pressure grooves is formed in between the end face at an opening in the bearing member, and the flat face of the rotor; and a radial bearing section furnished with dynamic pressure grooves is formed in between the inner peripheral surface of the bearing hole and the circumferential surface of the shaft. In addition, at least one ray-like groove that reaches from the radially inward edge of the dynamic-pressure-generating grooves in the thrust bearing section to the bearing hole is furnished in the bearing member.

From the following detailed description in conjunction with the accompanying drawings, the foregoing and other objects, features, aspects and advantages of the present invention will become readily apparent to those skilled in the art.

DETAILED DESCRIPTION

Figure 1:
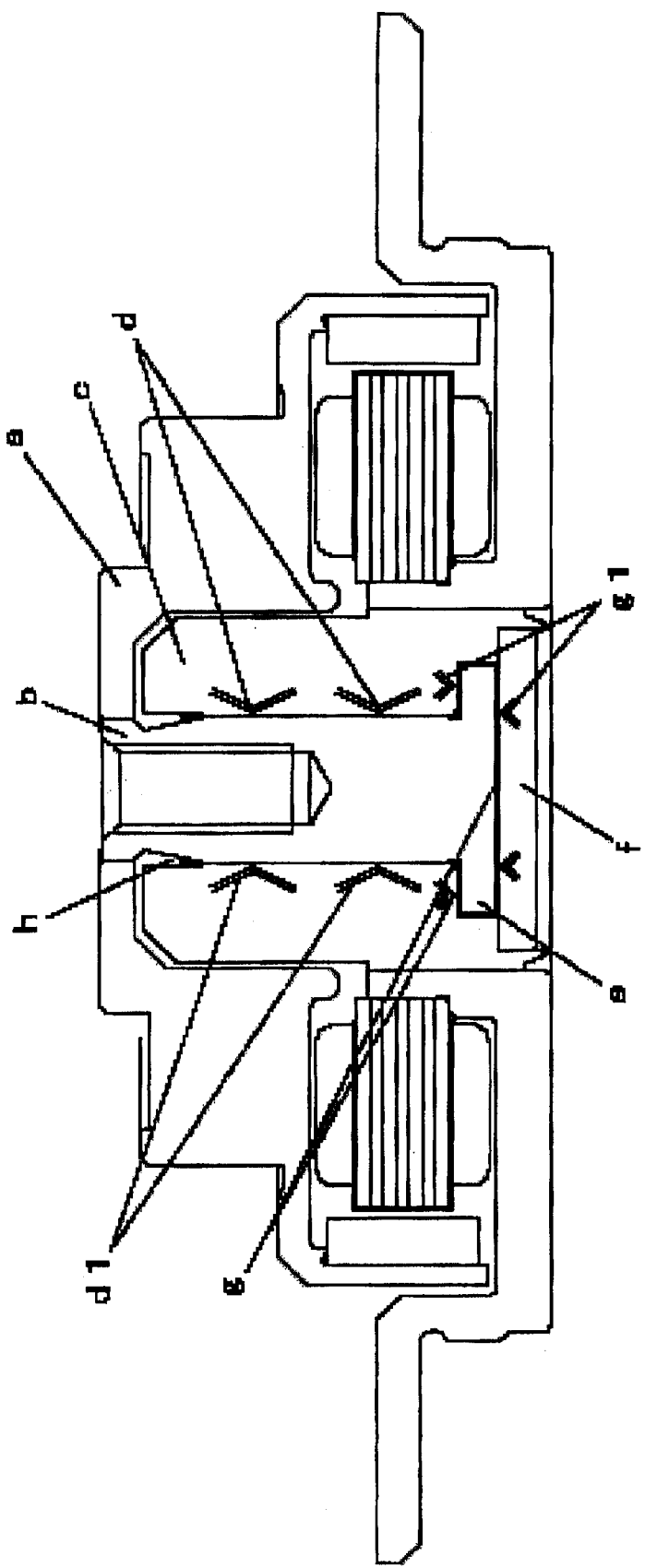
FIG. 1 is a sectional view diagramming the configurational outline of a conventional spindle motor.
Figure 2:
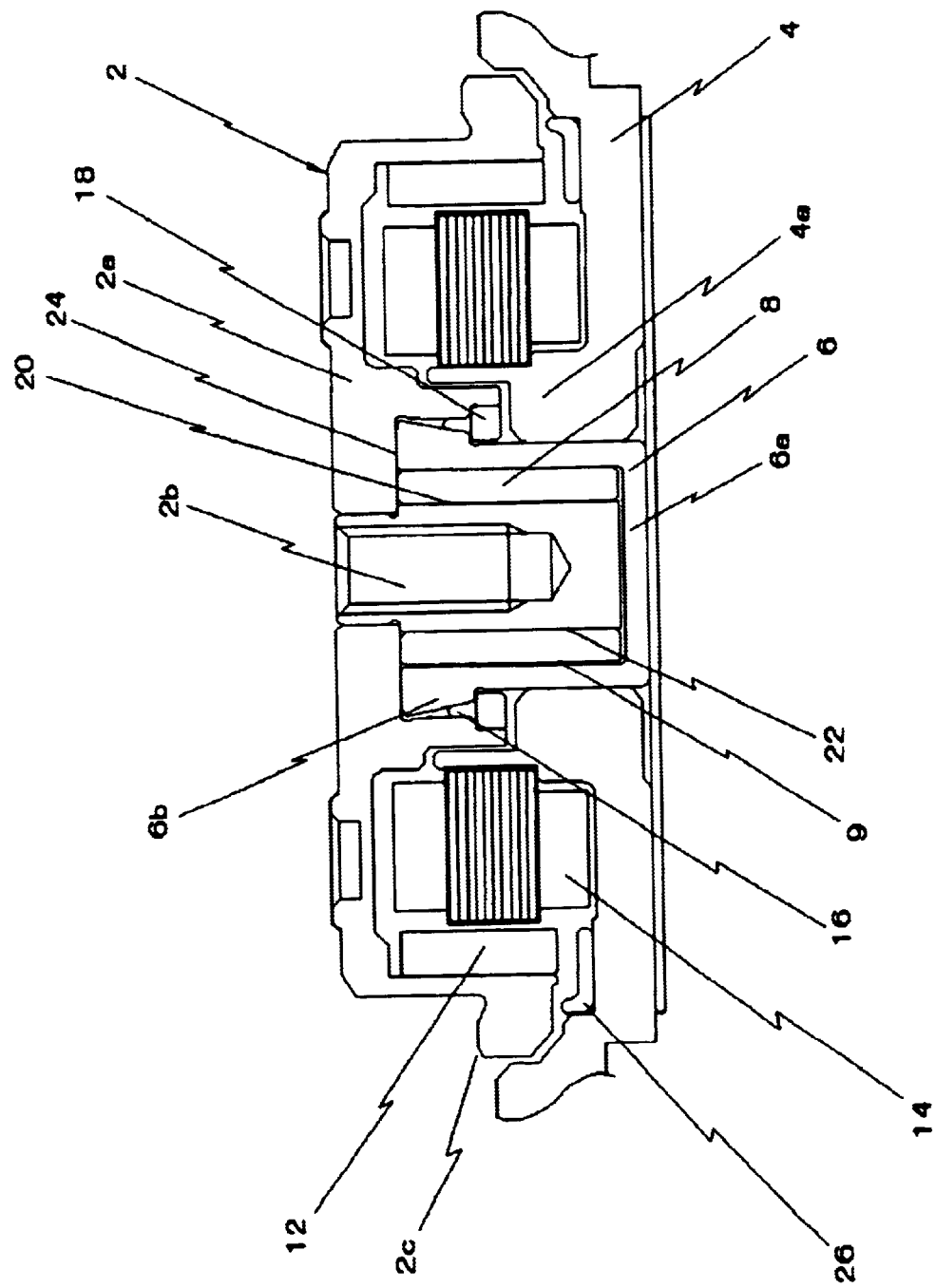
FIG. 2 is a sectional view diagramming the configurational outline of a spindle motor of the present invention.

Embodiments according to the present invention of a spindle motor and of a disk drive equipped therewith will be explained in the following with reference to FIGS. 2 through 6, but the present invention is not limited to the embodiments set forth below. It will be appreciated that although for the sake of convenience in the description of the present embodiments, "supper/lower, above/below, etc." are in the vertical direction of the drawings, the orientation of the spindle motor in its actually installed state is not limited.

(1) Configuration of Spindle Motor

To begin with, a spindle motor in an embodiment of the present invention will be explained with reference to FIGS. 2 through 5. The spindle motor in the first embodiment of the present invention includes: a rotor 2, composed of a rotor hub 2a and a shaft 2b provided coaxially with the rotational center of the rotor hub 2a; a cylindrical housing 6 affixed into a circular boss part 4a with which a bracket 4 is furnished; and a hollow similarly cylindrical sleeve 8 mounted within the housing 6. The circumferential margin of the rotor hub 2a is furnished with a flange-shaped disk-carrying section 2c on which recording disks (illustrated as disks 53 in FIG. 6) such as a hard disk are carried. A rotor magnet 12 is attached by adhesive or like means to the inner peripheral surface of the hub 2b. Also, a stator 14 radially opposing the rotor magnet 12 is affixed to the circumferential surface of the circular boss part 4a.

The housing 6, shaped by press-working a sheet-metal material, is roughly in the form of a cup whose under side is closed over. Further, the sleeve 8 is formed from a porous, oil-containing sintered metal material in which copper powder, iron powder, or the like are sintered and impregnated with oil. Forming the sleeve 8 in this way from a porous, oil-containing sintered metal means that dynamic-pressure-generating grooves, which will be described later, may be formed in the sleeve 8 at the same time it is produced, reducing the manufacturing costs. Moreover, porous, oil-containing sintered metal, being superiorly lubricative, curtails the occurrence of abrasion to enhance bearing reliability and endurance.

A through-hole (bearing hole) is provided in the sleeve 8, axially piercing its core; the shaft 2b is inserted in the through-hole. The circumferential surface of the shaft 2b radially opposes the inner peripheral surface of the sleeve 8 across a gap, while the end face of the shaft 2b axially opposes the inner surface of the closed-end portion 6a of the housing 6 across a gap. The sleeve 8 is mounted so as to position the end face at its upper end at approximately the same height as the end face at the upper end of the housing 6, and so as to set the end face at its lower end in opposition to the inner surface of the closed-end portion 6a of the housing 6 via a clearance. Likewise, the end faces at the upper ends of the housing 6 and the sleeve 8 axially oppose the circular face along the underside (flat face) of the rotor hub 2a across a gap.

The gap formed in between the end faces at the upper ends of the housing 6 and the sleeve 8, and the face along the underside of the rotor hub 2a; the gap formed in between the inner peripheral surface of the sleeve 8 and the circumferential surface of the shaft 2; the clearance formed in between the inner surface of the closed-end portion 6a of the housing 6 and the end face of the shaft 2; and the clearance formed in between the end face at the lower end of the adjoining sleeve 8 and the inner surface of the closed-end portion 6a of the housing 6 (each of these gaps/clearances, as well as clearances formed within communicating passages 9 that will be described shortly, taken together will be denoted "bearing clearances" hereinafter) are all consecutive. Oil is retained continuously without interruption within these consecutive clearances, wherein a full-fill structure is configured.

In addition, axial grooves 8a are provided in the circumferential surface of the sleeve 8, extending from the end face at its upper end to the end face at its lower end. By attaching the thus-configured sleeve 8 to the inner peripheral surface of the housing 6 the communicating passages 9 are formed by means of the axial grooves 8a and the inner peripheral surface of the housing 6. Oil is retained within the communicating passages 9 also, wherein the oil retained in the gap formed in between the inner peripheral surface of the sleeve 8 and the circumferential surface of the shaft 2b runs successively through the gap formed in between the end faces at the upper ends of the housing 6 and the sleeve 8, and the face along the underside of the rotor hub 2a, the clearance formed in between the end face at the lower end of the sleeve 8 and the inner surface of the closed-end portion 6a of the housing 6, and the communicating passages 9. (How the oil is compensated through the communicating passages 9 will be described in detail later.)

The upper-end portion of the outer peripheral surface of the housing 6 is made into an annular flange 6b that juts radially outward and is formed to have a sloping-face contour so that its outer peripheral surface shrinks diametrically with further separation from the upper-end face of the housing 6. Likewise, a portion of the rotor hub 2a at the radially outer edge of the face along the underside is made into a peripheral wall 2d that depends toward the bracket 4. The inner peripheral surface of the peripheral wall 2d and the outer peripheral surface of the flange 6b radially opposing and out of contact with each other.

By the outer peripheral surface of the flange 6b being formed to have a sloping-face contour as just mentioned, the radial gap dimension of the gap defined in between the inner peripheral surface of the peripheral wall 2d and the outer peripheral surface of the flange 6b flares gradually toward the bracket 4 (in the direction of the distal edge of the peripheral wall 2d); in other words, heading oppositely the gap has a tapered form. This means that a taper seal area 16 is configured by a functional association between the inner peripheral surface of the peripheral wall 2d and the outer peripheral surface of the flange 6b. Only in this taper seal area 16 does the oil retained in the above-described clearances meet the air, in an interface where the surface tension of the oil and atmospheric pressure balance, forming the oil-air interface into a meniscus.

The taper seal area 16 serves as an oil reserve whereby according to the amount of oil retained within the taper seal area 16, the position where the interface forms can shift to suit. This means that oil retained within the taper seal area 16 is supplied to the later-described bearing sections in response to a decrease in oil retention volume, and that oil that has increased volumetrically owing to thermal expansion or other causes is accommodated within the taper seal area 16.

The fact that a taper-shaped gap is thus formed in between the outer peripheral surface of the flange 6b portion of the housing 6 and the inner peripheral surface of the peripheral wall 2d portion of the rotor hub 2a, constituting the taper-seal area 16 in which surface tension is exploited, means a diametrically larger taper-seal area 16, and a taper-seal area 16 whose axial dimension is relatively large. The capacity within the taper-seal area 16 is consequently enlarged to be able adequately to match even the thermal expansion of the large amount oil retained in dynamic pressure bearings of the full-fill structure.

An annular retaining ring 18 is affixed by adhesive or like means to the distal edge portion of the peripheral wall 2d beyond the taper-seal area 16. The retaining ring 18 is fit snugly yet out of contact with the bottom of the flange 6b, thereby constituting a structure that with respect to the housing 6 retains the rotor 2 from coming out.

The fact that the structure for retaining the rotor 2 is configured alongside the circumferential surface of the housing 6, means that the pair of radial bearing sections, which will be described in detail later, and the retaining structure, are not disposed ranged on the same line in the axial direction. This enables putting to use as a bearing the entirety of the axial height dimension of the mutually opposing outer circumferential surface of the shaft 2b and inner peripheral surface of the sleeve, to realize further slimming down of the motor while maintaining bearing stiffness.

The top face of the retaining ring 18 and the bottom face of the flange 6b, and the inner peripheral surface of the retaining ring 18 and the circumferential surface of the housing 6, are continuous with the taper-seal area 16, and oppose each other across a gap having a clearance dimension that is smaller than the minimum radial clearance dimension of the taper-seal area 16 gap.

Setting to be as small as possible the gap dimensions of the axial gap defined in between the top face of the retaining ring 18 and the bottom face of the flange 6b, and the radial clearance formed in between the inner peripheral surface of the retaining ring 18 and the circumferential surface of the housing 6, enlarges the difference when the spindle motor is rotating between the flow speed of the air in these gaps in between the retaining ring 18 and the housing 6, and the flow speed of the air in the radial gap defined in the taper-seal area 16. The gap-defining surfaces of the housing 6, flange 6b, and retaining ring 18 function as a labyrinth seal in which the difference in airflow speed makes greater the resistance against outflow to the bearing exterior of vapor that has arisen due to the oil gasifying, to keep vapor pressure of the oil in the vicinity of the boundary surface high, and that further prevents the oil from transpiring.

Thus providing the labyrinth seal in continuity with the taper-seal area 16 enables not only impeding the oil from flowing out as a fluid, but also blocking the outflow to the motor exterior of oil mist generated by the oil gasifying due to such causes as elevation in temperature of the motor external environment. This consequently prevents decline in the volume of oil retained, which can maintain stabilized bearing performance over the long term, and makes for bearings of high endurance and reliability.

(2) Configuration of Bearing Sections

Figure 3:
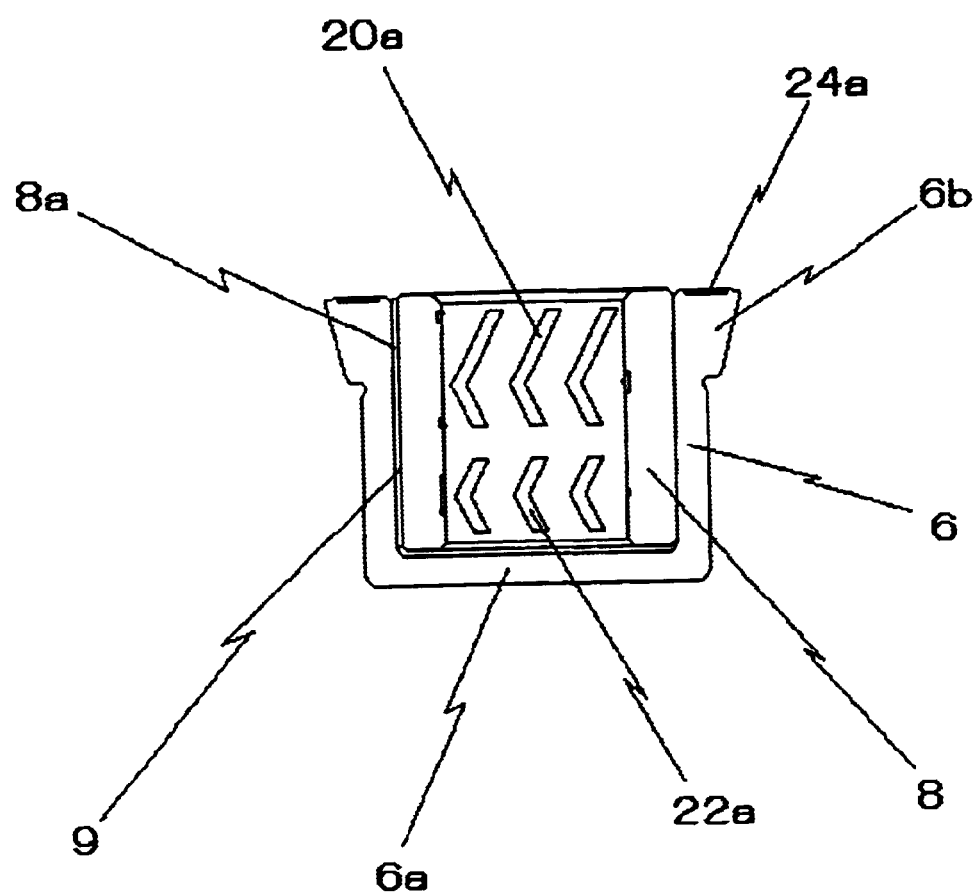
FIG. 3 is a fragmentary enlarged section view showing on a larger scale the configuration of the sleeve in the spindle motor illustrated in FIG. 2.

Reference is made now to FIG. 3, a sectional view of the sleeve 8. As illustrated in FIG. 3, herringbone grooves 20a for inducing fluid dynamic pressure in the oil when the rotor 2 spins, constituted by linking pairs of spiral striations that slope into each other from mutually opposing directions with respect to the rotary direction, are formed in the inner peripheral surface of the sleeve 8 along its upper end. An upper radial bearing section 20 is thus configured in between the inner peripheral surface of the sleeve 8 where the herringbone grooves 20a are formed, and the circumferential surface of the shaft 2b.

In the herringbone grooves 20a of the upper radial bearing section 20, the spiral striation set located along the upper side is formed greater in axial dimension than is the spiral striation set located along the lower side. The herringbone grooves 20 thus are formed to generate, in response to the rotor 2 rotating, a dynamic pressure maximum in a locus biased downward from the center, and at the same time to produce pressure that presses in on the oil downward. This inward-pressing pressure keeps the internal pressure of the oil retained within the gap where located lower than the upper radial bearing section 20 at atmospheric pressure or more.

Likewise, herringbone grooves 22a for inducing fluid dynamic pressure in the oil when the rotor 2 spins, configured by linking pairs of spiral striations that slope into each other from mutually opposing directions with respect to the rotary direction, are formed in the inner peripheral surface of the sleeve 8 along its lower end, wherein in between that inner peripheral surface and the circumferential surface of the shaft 2b a lower radial bearing section 22 is configured.

The herringbone grooves 22a formed in the lower radial bearing section 22 are designed so that the spiral striations generate a substantially equivalent pumping force—so that the groove fundamentals, which are axial dimension and inclination angle with respect to the rotary direction, or groove width and depth, will be the same. In other words, the spiral striations are configured to be linearly symmetrical with respect to where they link. In the lower radial bearing section 22 the greatest dynamic pressure consequently appears in the axially central part of the bearing.

Figure 4A:
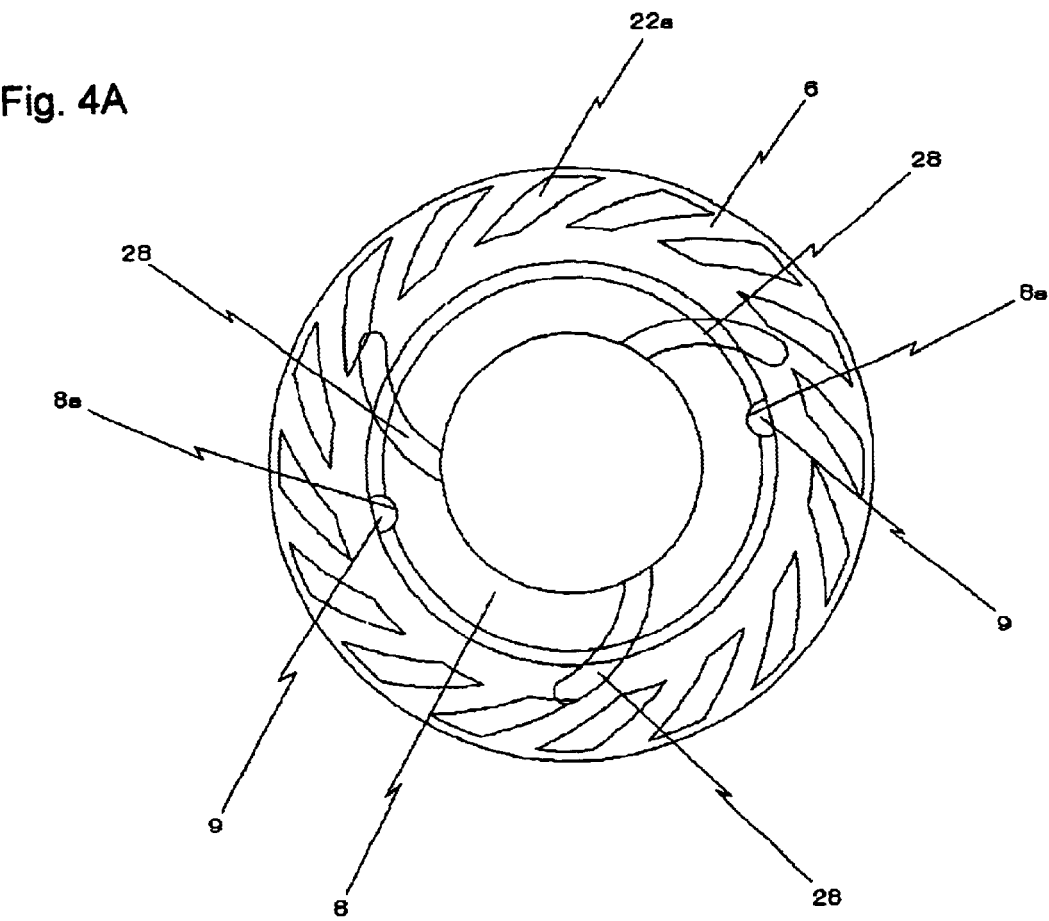
FIG. 4A is a plan view depicting the upper-end face of a bearing member of the spindle motor illustrated in FIG. 2.

Reference is now made to FIG. 4A, which depicts pump-in spiral grooves 24a that induce pressure heading radially inward (toward the shaft 2b) in the oil when the rotor 2 spins, formed in the end face of the housing 6 at its upper end, wherein a thrust bearing section 24 is configured in between that end face and the face along the underside of the rotor hub 2a.

These herringbone grooves 20a and 22a furnished in the upper and lower radial bearing sections 20 and 22 can be formed by press-working the sleeve 8 manufactured of a sintered material. Likewise, the spiral grooves 24a furnished in the thrust bearing section 24 are formable at the same time the housing 6 is press-molded.

It should be understood that the end face along the free-end portion of the shaft 2b and the inner surface of the closed-end portion 6a of the housing 6 function as a hydrostatic bearing section exploiting oil internal pressure heightened, as will later be described in detail, by the spiral grooves 24a of the thrust bearing section 24.

(3) Shaft Support Method

The way in which the bearing sections configured as set out above function for journal support will next be described in detail.

Pumping force by agency of the herringbone grooves 20a and 22a in the upper and lower radial bearing sections 20, 22 rises attendant on rotation of the rotor 2, producing fluid dynamic pressure. As far as pressure distribution in the upper and lower radial fluid dynamic bearings 20, 22 is concerned, pressure rises abruptly from alongside either ends of the herringbone grooves 20a, 22a and becomes maximal where the spiral striations link. The fluid dynamic pressure generated in the upper and lower radial hydrodynamic bearings 20, 22 is utilized to support the rotor 2 through the upper/lower axial ends of the sleeve 8 and the shaft 2b, and plays roles both in centering the rotor 2 and restoring it from deviations.

Radially inward-heading pressure is induced in the oil in the thrust bearing section 24 by the pump-in spiral grooves 24a attendant on rotation of the rotor 2. The radially inward-heading pressure raises the oil internal pressure of the oil, generating fluid dynamic pressure acting in a lifting direction on the rotor 2, and meanwhile keeps the pressure of the oil that as a whole is retained deeper into the bearing clearances (more toward the closed end 6a) than the thrust bearing section 24 at positive pressure. It should be understood that the fluid dynamic pressure induced in the thrust bearing section 24 does not rise abruptly as is the case with the upper and lower radial hydrodynamic bearings 20, 22; rather, at maximum it is at a level exceeding atmospheric pressure to a certain degree. The oil retained in the bearing clearances deeper inward than the thrust bearing section 24 is pressure-wise brought into an essentially sealed state by the radially inward-heading pressure generated in the thrust bearing section 24.

With the herringbone grooves 20a formed in the upper radial bearing section 20 being axially asymmetrical in form, dynamic pressure that presses downward on the oil is generated, whereby dynamic pressure that becomes maximal in the locus biased a certain extent from the center of this bearing section toward the lower radial bearing section 22 is generated. This dynamic pressure supports the shaft 2b across its axially upper side, and keeps the pressure in the region between the upper radial bearing section 20 and the lower radial bearing section 22 at positive pressure—atmospheric pressure or greater—to prevent negative pressure from arising.

Now the pressure generated in the thrust bearing section 24 is as just noted at a level somewhat in excess of atmospheric pressure, but for this alone to put sufficient lift on the rotor 2 would be problematic. Nevertheless, as described above the internal pressure of the oil in being retained in between the end face of the shaft 2b and the inner surface of the housing 6 closed-end portion 6a functions as a hydrostatic bearing section because the pressure is transmitted through the communicating passages 9 so as to become equal to the internal pressure of the oil raised by the fluid dynamic pressure induced in the thrust bearing section 24. These thrust-bearing 24 and hydrostatic bearing sections operate associatively to enable sufficient lift to be put on the rotor 2.

In the same regard, an annular thrust yoke 26 made of a ferromagnetic material is disposed in a position on the bracket 4 opposing the rotor magnet 12, generating magnetic attraction in the axial direction between the rotor magnet 12 and the thrust yoke 26. This magnetic force balances the lifting pressure on the rotor 2 that is generated by the thrust bearing section 24 and by the hydrostatic bearing section between the end face of the shaft 2b and the inner surface of the housing 6 closed-end portion 6a, stabilizing the thrust-oriented support of the rotor 2. This sort of magnetic urging on the rotor 2 can be effectuated also by, for example, displacing the magnetic centers of the stator 14 and the rotor magnet 12 axially from each other.

(4) Configuration and Function of Communicating Passages

The axial grooves 8a provided in the circumferential surface of the sleeve 8 can be formed so that in sectional outline they are semicircular as shown in FIG. 4A, or else are roughly rectangular or triangular, by die-stamping the sleeve 8 at the same time it is formed of a porous, oil-containing sintered metal into its cylindrical shape. However, the axial grooves 8a can be formed by machining the sleeve 8 after it has been formed into its cylindrical shape.

As illustrated in FIG. 3, the communicating passages 9, which continue from the upper end to the lower end of the sleeve 8 in the axial direction, are defined between the inner peripheral surface of the housing 6 and the axial grooves 8a when the sleeve 8 is attached to the inner peripheral surface of the housing 6. Within the communicating passages 9, oil is retained as described earlier in continuity with the oil retained within the series of bearing clearances. By the same token, the internal pressure of the oil retained within the communicating passages 9 is balanced with the internal pressure of the oil retained within the bearing sections.

By either the micro-gap formed in between the inner peripheral surface of the sleeve 8 and the circumferential surface of the shaft 2b, where the upper and lower radial bearing section 20 and 22 are configured, remaining consistent in its predetermined dimension, or by the herringbone grooves 20a and 22a remaining consistent in their predetermined precision, the oil retained in the bearing sections will be on par at least with the pressure generated in the thrust bearing section 24, meaning that the oil internal pressure will not go negative.

On the other hand, if due to discrepancy in processing the inner peripheral surface of the sleeve 8 or the circumferential surface of the shaft 2b the micro-gap formed in between the inner peripheral surface of the sleeve 8 and the circumferential surface of the shaft 2b is formed wider at its upper end axially than at its lower end, the dynamic pressure generated along the lower radial bearing section 22 will exceed the dynamic pressure generated in the upper radial bearing section 20, producing a flow of oil heading from along the axial lower side to along the upper side, risking that the internal pressure of the oil retained along the closed-end portion 6a of the housing 6, i.e., deeper within the bearing clearances, will turn negative. Likewise, should the micro-gap formed in between the inner peripheral surface of the sleeve 8 and the circumferential surface of the shaft 2b be formed narrower at its upper end axially than at its lower end, the dynamic pressure that the herringbone grooves 22a provided in the upper radial bearing section 20 generate will go over the predetermined pressure, giving rise to negative pressure between the end face of the shaft 2b and the closed-end portion 6a of the housing 6. And when in this case the oil is set flowing from along the axial upper side to along the lower side, there would be a concern lest the internal pressure of the oil in between end face of the shaft 2b and the closed-end portion 6a of the housing 6 rise higher than is necessary and produce over-lift on the rotor 2.

In contrast to these scenarios, by providing the communicating passages 9, though the dynamic pressure generated in the thrust bearing section 24 declines somewhat, the attenuation will be transmitted to the oil retained along the closed-end portion 6a of the housing 6, and therefore under normal conditions the internal pressure of the oil in that region will not go negative.

As mentioned earlier, the herringbone grooves 20a provided in the upper radial bearing section 20, inasmuch as they are axially asymmetrical in form, generate dynamic pressure that presses downward on the oil to keep the pressure in the region between the upper radial bearing section 20 and the lower radial bearing section 22 positive at atmospheric or greater, preventing the occurrence of negative pressure. Meanwhile, the herringbone grooves 20a generate compressive force that constantly sets the oil flowing, and that pressurizes the oil so as to recirculate it toward the upper radial bearing section 20, setting up a series of circulatory paths in which the oil is sent: from the lower radial bearing section 22 and from between the end face along the lower end of the sleeve 8 and the inner surface of the closed-off end portion 6a of the housing 6, by way of the communicating passages 9 and by way of the interval between the end face along the upper end of the sleeve 8 and the face along the underside of the rotor hub 2a, toward the axial upper-end areas of the circumferential face of the shaft 2b and the inner peripheral surface of the sleeve 8.

The series of circulatory paths serves to balance the pressure of the oil within the bearing clearances by constantly setting it in motion in a given direction. This prevents occurrences of air bubbles due to negative pressure and occurrences of over-lift on the rotor 2, and markedly broadens the margin of error tolerated in the manufacturing process, thereby improving yield rate. For that matter, even should a factor in the manufacturing process be so far off that the fluid dynamic pressure generated along the lower radial bearing section 22 exceeds at its greatest pressure the inward-pressing pressure generated in the upper radial bearing section 20, the pressure difference would set the oil flowing in the direction opposite to that noted above, likewise setting up circulatory paths whereby the pressure difference would be canceled.

It will be appreciated that inasmuch the communicating passages 9 are disposed so that on the one end the passages 9 open radially inward of the thrust bearing section 24, oil pressure within regions of higher than atmospheric pressure is held constant. This means that the bearing sections where they are further inward than the thrust bearing section 24 are pressure-wise brought into a sealed state by the thrust bearing section 24.

If for instance the communicating passages 9 on the one end were to open in between the bearing sections and the taper seal area, as long as the predetermined dynamic pressure were generated in the bearing sections, such as when motor rotation is steady, sufficient supporting stiffness would be produced, and the likelihood that knocking or grazing in the bearing sections would arise would therefore be slight. If, however, the motor rotational speed were to drop, such as when the motor is halted, inasmuch as the communicating passages 9 on the one end opened into an area apart from the region sealed pressure-wise—i.e. into a region where the oil pressure would be equal to or otherwise below atmospheric pressure—the oil pressure that within the bearing section had been sustained high would drop abruptly, on account of the pressure difference with the oil pressure in the area where the communicating passages 9 would open.

By the pressure within the bearing sections thus dropping abruptly, the rotor 2 would be prone to wobbling or running eccentrically, meaning that knocking and grazing between parts such as the shaft 2b and the sleeve 8 that constitute the bearing sections would arise. While conceivable causes for this include weight imbalance in the rotor 2 incorporating the recording disks carried by the rotor hub 2a, processing and assembly tolerances in the parts composing the motor, or imbalance in magnetic force acting in between the stator 14 and the rotor magnet 12, with such knocking and grazing in the bearing sections reoccurring every time the motor is halted, the striking wear and tear on the parts composing the bearing sections would degrade the motor reliability and durability.

In contrast to this scenario, by having the communicating passages 9 open radially inward of the thrust bearing section 24, the pumping by the spiral grooves 24a that induces radially-inward-acting fluid dynamic pressure in the oil will continue operating until just before the motor comes to a complete halt. Since the thrust bearing section 24 thus functions as a partition wall pressure-wise, pressure drop within the bearing sections is eased, and knocking and grazing of the parts that make up the bearing sections is mitigated, which holds degradation in motor reliability and durability in check.

(5) Discharge of Air Bubbles

Oil is filled into the bearing gaps in the above-described spindle motor according to the following procedure. Namely, a unit in a state in which the shaft 2b having been fixedly fitted into the rotor hub 2a beforehand is inserted into a bearing member composed of the housing 6 and the sleeve 8 (the unit in such a state will be denoted a "bearing unit" below) is put under an environment in which the pressure has been reduced so as to be lower than atmospheric pressure, and the air within the bearing gaps is discharged. It should be understood that oil impregnates the sleeve 8 at this point. A predetermined amount of oil is then dripped using means such as a dispenser, for example, into the taper-seal area 16 of the bearing unit, and the environment under which the bearing unit had been left is returned to the normal-pressure state, whereby the difference in pressure pushes the oil into the bearing gaps. This finishes the oil-filling process with respect to the bearing unit.

By setting in advance the level of pressure reduction and the pressure-reduction time, the oil-filling procedure is administrated so that air within the bearing clearances does not turn into air bubbles and remain behind within the oil, but working the residual air bubbles out completely from all of the bearing units is, owing to operational mistakes and other worker errors, difficult. What is more, even supposing that in the oil-filling process the air bubbles could be completely discharged from within the micro-gaps in the bearing unit, when external vibration and shock is applied to the rotor 2 on occasions such as when the spindle motor is transported, for example, air bubbles will sometimes appear within the oil on account of cavitation by the rotor 2 vibrating excessively.

When a spindle motor incorporating a bearing unit in a condition of this sort—in which air bubbles remain behind within the oil—is shipped, what happens is that the air bubbles concentrate within the gap in between the upper-end face of the sleeve 8 and the face along the underside of the rotor hub 2a, and within the gap in between the end face along the free end of the shaft 2b and the inner surface of the closed-end portion 6a of the housing 6, which constitute the hydrostatic bearing. These gaps in which the air bubbles thus concentrate are in the region radially inward of the thrust bearing section 24, and this concentrating of air bubbles originates from the fact that the region is one in which the pressure gradient within the oil is comparatively small even during rotation.

Nevertheless, providing the ray-like grooves 28 that, as illustrated in FIG. 4A, are continuous from the radially inner rim of the upper-end face of the sleeve 8 to along the radially inward edge of the spiral grooves 24a results in the oil retained along the radially inward region of the thrust bearing section 24 being stirred, and circumferentially oriented pressure fluctuations appearing intermittently and randomly therein while positive pressure is maintained. By the air bubbles being swept into such circumferentially directed pressure fluctuations, the air bubbles are rendered tinier than the clearance dimension of the micro-gaps. The air bubbles having thus been minced then migrate in turn toward the taper-seal area 16, where the pressure within the bearing gaps is at its lowest, and are released through the oil-air interface into the external air. It should be understood that the actions and effects described above can be obtained by furnishing as few as one ray-like groove 28. Nevertheless, in order to render the air bubbles finer and do so more surely, a plurality of the grooves, spaced approximately equally in the circumferential direction, is preferably provided.

In that case, it would also be possible to form the ray-like grooves 28 independently on the sleeve 8 end and on the housing 6 end, respectively, without having them in a configuration in which they are continuous from the upper-end face of the sleeve 8 to the upper end face of the housing 6.

Figure 4B:
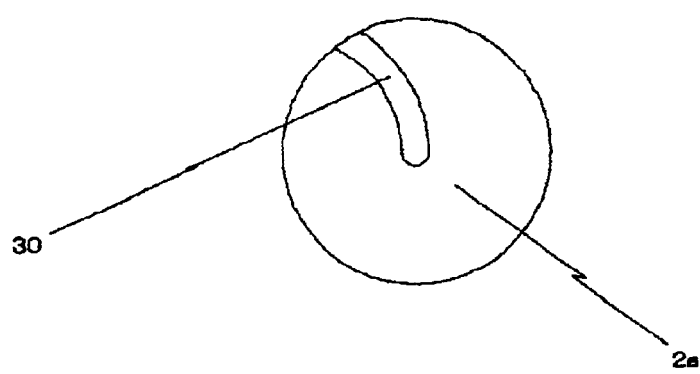
FIG. 4B is a plan view depicting the lower-end face of the shaft in the spindle motor illustrated in FIG. 2.

Likewise, furnishing a ray-like groove 30 as illustrated in FIG. 4B in the end face along the free end of the shaft 2b enables air bubbles to be discharged, in a like manner to that described above, from the oil retained within the gap in between the end face along the free end of the shaft 2b and the inner surface of the closed-end portion 6a of the housing 6, which constitute the hydrostatic bearing. In this case, air bubbles minced by the ray-like groove 30 migrate toward the thrust bearing section 24 via the communicating passages 9 and are released to the external air from the taper-seal area 16.

With regard to the bearing unit configuration overall, it turns out that in molding, or in the course of high-precision surfacing on, the parts constituting the bearing unit chamfers are furnished in each of the corner portions of the parts, and of particular concern is that the nesting of such chamfers in between the upper-end corner portion on the inner peripheral surface of the housing 6 and the upper-end corner portion on the outer peripheral surface of the sleeve 8 means that a large gap is created.

Comparatively large air bubbles are liable to pool within a large clearance like this, and there could be instances in which the air bubbles tend not to become minced even though they are stirred by the ray-like grooves 28.

Figure 5:
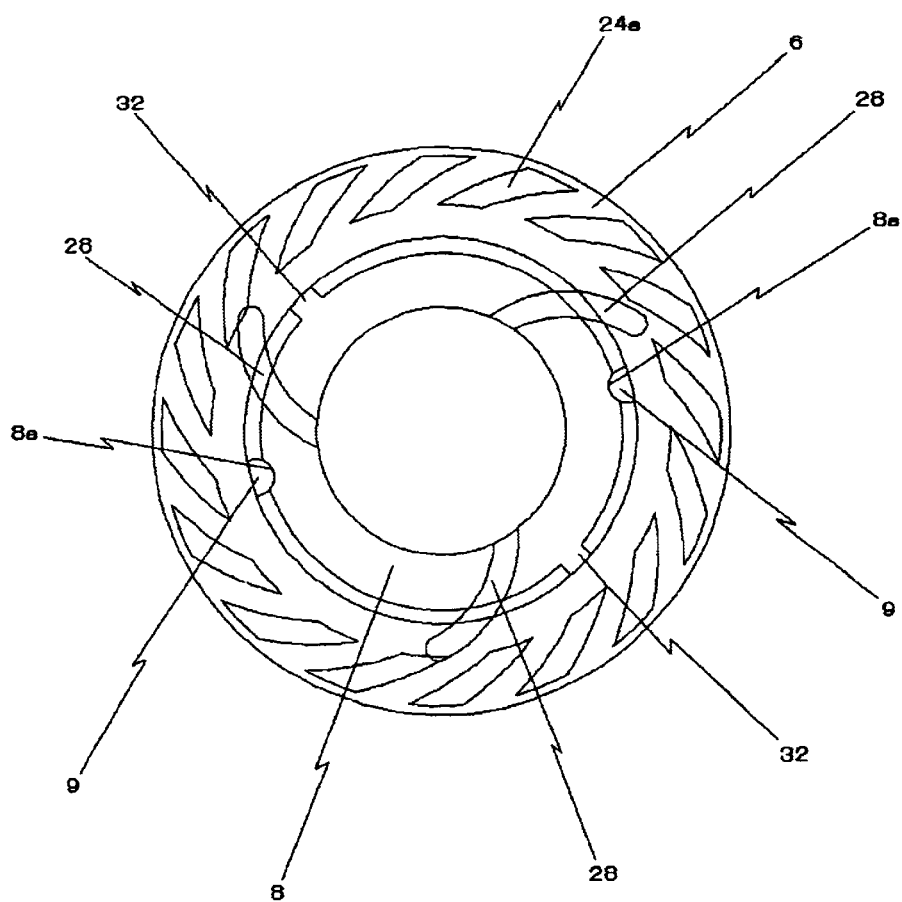
FIG. 5 is a plan view depicting a modified example of the upper-end face of the bearing member of the spindle motor illustrated in FIG. 2.

In order to ensure that large air bubbles of this sort are minced, furnishing bridge-like projections 32 as illustrated in FIG. 5 on the upper-end corner portion on the outer peripheral surface of the sleeve 8 enables the air bubbles that rotate together with the rotor hub 2a to be split up into finer air bubbles by colliding with the projections 32. It will be appreciated that the number of projections 32 provided may be one or more.

The projections 32 can be furnished in ways such as by providing in advance corresponding recesses in the mold utilized in baking the sleeve 8, or by dripping on molten metal or synthetic resin after the sleeve 8 is baked and machining or the like to mold the material into predetermined form.

(6) Disk-Drive Configuration

Figure 6:
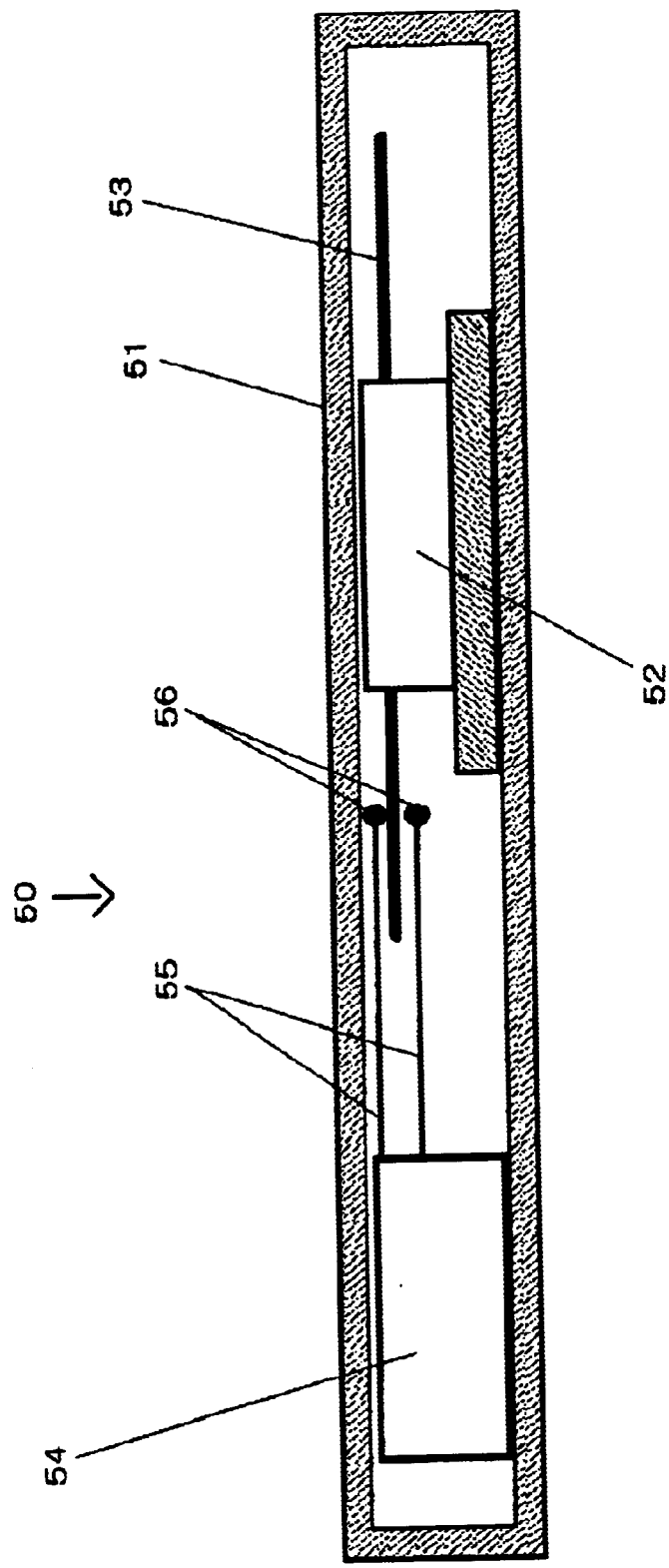
FIG. 6 is a sectional view schematically illustrating the internal configuration of a disk drive.

The internal configuration of a general disk-drive device 50 is represented in a schematic view in FIG. 6. A clean space where dust and debris are extremely slight is formed inside a housing 51, in the interior of which is installed a spindle motor 52 on which platter-shaped disks 53 for recording information are fitted. In addition, a head-shifting mechanism 57 that reads information from and writes information onto the disks 53 is disposed within the housing 51. The head-shifting mechanism 57 is constituted by: heads 56 that read/write information on the disks 53; arms 55 that support the heads 56; and an actuator 54 that shifts the heads 56 and arms 55 over the requisite locations on the disks 53.

Utilizing a spindle motor of the foregoing embodiments as the spindle motor 52 for the disk drive 50 as such enables the disk drive 50 to be made low-profile and reduced-cost, and at the same time improves the stability, reliability and endurance of the spindle motor to render a more highly reliable disk drive.

While single embodiments in accordance with the present invention of a spindle motor and a disk drive equipped therewith have been explained in the foregoing, the present invention is not limited to such embodiments. Various changes and modifications are possible without departing from the scope of the invention.

What is claimed is:

1. A spindle motor comprising:
a shaft;
a unilaterally open-ended cylindrical bearing member having a bearing hole into which said shaft is inserted and a closed-end surface axially opposing the inserted-end face of said shaft;
a rotor that rotates together with said shaft and has a circular flat face extending radially outward from the circumferential surface of said shaft;
a series of bearing clearances filled with oil, formed in between said bearing member, and said shaft and the flat face of said rotor;
a thrust bearing section provided with dynamic-pressure-generating grooves contoured to impart on the oil pressure acting radially inward during rotation of said rotor, and formed in between the flat face of said rotor and an end face of said bearing member axially opposing the rotor flat face;
a radial bearing section provided with dynamic-pressure-generating grooves contoured to impart on the oil pressure acting inward from either end axially during rotation of said rotor, and formed in between an inner peripheral surface of said bearing hole and a circumferential surface of said shaft radially opposing the bearing-hole inner peripheral surface; and
at least one ray-like groove provided in the bearing member end face where said thrust bearing section is formed, and reaching from a radially inward edge portion of the dynamic-pressure-generating grooves provided in said thrust bearing section to said bearing hole.

2. A spindle motor as set forth in claim 1, wherein:
said bearing member is composed of a hollow cylindrical sleeve in which said bearing hole is provided, said sleeve therein having an end face where said thrust bearing section is formed, and a cup-shaped bearing housing one end of which is closed over, for retaining said sleeve;
the dynamic-pressure-generating grooves in said thrust bearing section are formed in the other end of said bearing housing; and
said ray-like groove is formed in said end face of said sleeve.

3. A spindle motor as set forth in claim 2, an encircling chamfer being provided circumferentially on the end face of said sleeve along the thrust bearing section, wherein at least one projection is arranged within a gap formed in between the chamfer and said bearing housing.

4. A spindle motor as set forth in claim 2, wherein said sleeve is installed so as to protrude beyond said bearing housing toward the flat face of said rotor.

5. A spindle motor as set forth in claim 2, wherein a communicating passage is formed in between the outer circumferential surface of said sleeve and the inner peripheral surface of said bearing housing with one end of said communicating passage opening on said thrust bearing section radially inwardly therein, and with either axial end of a one of said bearing clearances being formed in between the inner peripheral surface of said bearing hole and the circumferential surface of said shaft communicating through said passage, for balancing pressure within said bearing clearances.

6. A spindle motor as set forth in claim 2, further comprising:
a cylindrical wall provided on said rotor, depending from the flat face thereof and radially opposing across a gap the circumferential surface of said bearing housing;
a tapered face that shrinks diametrically according as its outer diameter is away from the flat face of said rotor, provided on the circumferential surface of said bearing housing; wherein
the oil forms and retains a meniscus between said tapered face and the inner peripheral surface of the cylindrical wall.

7. A spindle motor as set forth in claim 6, wherein:
a stepped portion is provided on said bearing housing where its circumferential surface continuous with said tapered face is recessed radially inward;
a radially inward-projecting annular member corresponding to said stepped portion is affixed to the inner peripheral surface of said cylindrical wall on said rotor, and engagement between said stepped portion and said annular member constitutes a retainer for said rotor; and
a micro-gap smaller than the minimum clearance dimension of the radial gap formed in between said tapered face of said bearing housing and the inner peripheral surface of said cylindrical wall on said rotor is formed in between an upper face of said annular member and an undersurface of said stepped portion, functioning as a labyrinth seal.

8. A spindle motor as set forth in claim 1, wherein:
spiral grooves having a pump-in contour are provided as said dynamic-pressure-generating grooves in said thrust bearing section;
said radial bearing section is axially separated twin constituents between the circumferential surface of said shaft and the inner peripheral surface of said bearing hole;
herringbone grooves in an axially unbalanced conformation are provided as said dynamic-pressure-generating grooves in at least either one of the twin constituents of said radial bearing section, for pressuring the oil toward the closed end of said bearing member from along the open end thereof; and
a hydrostatic bearing employing the dynamic pressure generated in the thrust bearing section and radial bearing section is formed in between the inserted-end face of said shaft and the closed end of said bearing member.

9. A spindle motor as set forth in claim 1, wherein a ray-like groove is provided in the inserted-end face of said shaft, reaching from the axial center of said shaft to the perimetric edge of said end face.

10. A disk drive in which is mounted a disk-shaped recording medium onto which information is recordable, the disk drive including a housing; a spindle motor fixed within said housing, for spinning the recording medium; and an information accessing means for writing information into and reading information from requisite locations on said recording medium; the disk drive characterized in that said spindle motor comprises:
a shaft;
a unilaterally open-ended cylindrical bearing member having a bearing hole into which said shaft is inserted and a closed-end surface axially opposing the inserted-end face of said shaft;
a rotor that rotates together with said shaft and has a circular flat face extending radially outward from the circumferential surface of said shaft;

a series of bearing clearances filled with oil, formed in between said bearing member, and said shaft and the flat face of said rotor;

a thrust bearing section provided with dynamic-pressure-generating grooves contoured to impart on the oil pressure acting radially inward during rotation of said rotor, and formed in between the flat face of said rotor and an end face of said bearing member axially opposing the rotor flat face;

a radial bearing section provided with dynamic-pressure-generating grooves contoured to impart on the oil pressure acting inward from either end axially during rotation of said rotor, and formed in between an inner peripheral surface of said bearing hole and a circumferential surface of said shaft radially opposing the bearing-hole inner peripheral surface; and at least one ray-like groove provided in the bearing member end face where said thrust bearing section is formed, and reaching from a radially inward edge portion of the dynamic-pressure-generating grooves provided in said thrust bearing section to said bearing hole.

11. A disk drive as set forth in claim 10, wherein:

said bearing member is composed of a hollow cylindrical sleeve in which said bearing hole is provided, said sleeve therein having an end face where said thrust bearing section is formed, and a cup-shaped bearing housing one end of which is closed over, for retaining said sleeve;

the dynamic-pressure-generating grooves in said thrust bearing section are formed in the other end of said bearing housing; and said ray-like groove is formed in said end face of said sleeve.

12. A disk drive as set forth in claim 11, an encircling chamfer being provided circumferentially on the end face of said sleeve along the thrust bearing section, wherein at least one projection is arranged within a gap formed in between the chamfer and said bearing housing.

13. A disk drive as set forth in claim 11, wherein said sleeve is installed so as to protrude beyond said bearing housing toward the flat face of said rotor.

14. A disk drive as set forth in claim 11, wherein a communicating passage is formed in between the outer circumferential surface of said sleeve and the inner peripheral surface of said bearing housing with one end of said communicating passage opening on said thrust bearing section radially inwardly therein, and with either axial end of a one of said bearing clearances being formed in between the inner peripheral surface of said bearing hole and the circumferential surface of said shaft communicating through said passage, for balancing pressure within said bearing clearances.

15. A disk drive as set forth in claim 11, further comprising:

a cylindrical wall provided on said rotor, depending from the flat face thereof and radially opposing across a gap the circumferential surface of said bearing housing;

a tapered face that shrinks diametrically according as its outer diameter is away from the flat face of said rotor, provided on the circumferential surface of said bearing housing; wherein the oil forms and retains a meniscus between said tapered face and the inner peripheral surface of the cylindrical wall.

16. A disk drive as set forth in claim 15, wherein:

a stepped portion is provided on said bearing housing where its circumferential surface continuous with said tapered face is recessed radially inward;

a radially inward-projecting annular member corresponding to said stepped portion is affixed to the inner peripheral surface of said cylindrical wall on said rotor, and engagement between said stepped portion and said annular member constitutes a retainer for said rotor; and a micro-gap smaller than the minimum clearance dimension of the radial gap formed in between said tapered face of said bearing housing and the inner peripheral surface of said cylindrical wall on said rotor is formed in between an upper face of said annular member and an undersurface of said stepped portion, functioning as a labyrinth seal.

17. A disk drive as set forth in claim 10, wherein:

spiral grooves having a pump-in contour are provided as said dynamic-pressure-generating grooves in said thrust bearing section;

said radial bearing section is axially separated twin constituents between the circumferential surface of said shaft and the inner peripheral surface of said bearing hole;

herringbone grooves in an axially unbalanced conformation are provided as said dynamic-pressure-generating grooves in at least either one of the twin constituents of said radial bearing section, for pressuring the oil toward the closed end of said bearing member from along the open end thereof; and a hydrostatic bearing employing the dynamic pressure generated in the thrust bearing section and radial bearing section is formed in between the inserted-end face of said shaft and the closed end of said bearing member.

18. A disk drive as set forth in claim 10, wherein a ray-like groove is provided in the inserted-end face of said shaft, reaching from the axial center of said shaft to the perimetric edge of said end face.

* * * * *